106. COMPOSITIONS, COATING OR PLASTIC

Patented Aug. 11, 1942

2,292,616

UNITED STATES PATENT OFFICE 2,292,616

GYPSUM COMPOSITION

Manvel C. Dailey, Elmhurst, Ill., assignor to United States Gypsum Company, Chicago, Ill., a corporation of Illinois No Drawing. Application January 18, 1940, Serial No. 314,405

5 Claims. (Cl. 106—112)

This invention relates to an improved composition of matter especially adaptable for use in sealing of earth-bored holes, wells, earth dams, etc.

One of the objects of the present invention is a composition of matter consisting primarily of a form of calcined gypsum to which certain ingredients have been added so as to render the composition particularly suitable for use in the cementing of oil wells, the tamping of explosives in holes in the earth and preventing seepage under earth-fill dams, dikes, levees, and the like.

A further object is to provide such a composition in the form of a ready-mixed powder containing set-controlling ingredients which will overcome the set-disturbing conditions likely to be encountered in the use of the composition underground and under adverse conditions of time, pressure, agitation, and the like.

In the copending application, Serial No. 224,637, of Andrew C. Hamilton, Jr., now issued as United States Patent No. 2,191,652, there are described methods of cementing oil wells and other types of earth-bored holes, earth-fill dams, etc., with calcined gypsum of predetermined time of set. A calcined gypsum cement suitable for extensive use in this field must possess qualities not found in present known types of calcined gypsum products. Some of these more important requirements are:

1. UNIFORMITY OF SETTING TIME UNDER VARYING CONDITIONS OF MIXING AND AGITATION

In actual use, these cements are subjected to varying amounts of mixing and agitation by the three agencies of slurry-mixing, internal agitation and mixing during the process of pumping through casings, etc., and the agitation caused by forcing the slurry against formations through which gas, water, or oil is escaping. Normally retarded calcined gypsum has its setting time markedly affected by the amount or severity of the mixing which a slurry of the product receives. In general, the greater the amount of mixing or agitation to which present known types of calcined gypsum are subjected, the faster will be the setting time of the product. For use in earth-bored hole cementing operations it is important that the setting time of the product remain essentially the same under light or severe agitation, or under conditions of intermittent or continuous agitation.

2. UNIFORMITY OF SETTING TIME IN PRESENCE OF SET ACCELERATIVE OR RETARDIVE MATERIALS

A slurry of calcined gypsum cement being pumped into earth-bored holes, oil wells, etc., may come into contact with, and be contaminated by, many materials which markedly accelerate or retard the setting time of known products of this type. Such materials may include saline waters containing varying proportions of alkali chlorides, Epsom salts, alkaline bicarbonates, etc. These salts all act as set accelerators. Other waters encountered may contain soluble sulfides, borates, or organic matter which act as set retarders. Further, "drilling muds" used in well drilling operations may contain added chemicals such as sodium silicate, which is a powerful accelerator, or sodium metaphosphate, which is a powerful retarder.

3. UNIFORMITY OF SETTING TIME IN AGING OF THE DRY CEMENT UPON STORAGE

Most commercial calcined gypsum cements designed to set in time periods of about 40 minutes or longer are retarded with what is commonly called "commercial retarder." This retarder is generally a keratinous protein material hydrolyzed with alkalis and extended with a filler. Calcined gypsum cements containing this type of retarder, or other known colloidal retardive materials such as glue, casein, gelatin, etc., are not stable as to their setting time with age. Such cements may either quicken or lengthen very appreciably in setting time upon storage, dependent upon atmospheric conditions under which storage is maintained, the type of calcined gypsum employed, the effect of other materials in the cement, etc.

4. UNIFORMITY OF SETTING TIME UNDER TEMPERATURE VARIATIONS

Particularly in deep oil wells, high temperatures ranging frequently above 200° F. are encountered. Calcined gypsum cements retarded with commercial retarder are very susceptible to setting time changes at different temperatures. For example, a calcined gypsum retarded with commercial keratinous retarder has been found to possess setting times as follows, under varying conditions of temperature:

| Temperature, °F. | Time of set |
|---|---|
| | Minutes |
| 75 | 120 |
| 100 | 135 |
| 125 | 230 |
| 150 | 450 |
| 175 | (Net set in 12 hrs.) |

Obviously, for use in deep wells at temperatures much in excess of 100° F. such a cement would not perform satisfactorily.

5. UNIFORMITY OF RATE OF HYDRATION OR SET

For certain types of cementing operations it is desirable that the cement slurry stiffen gradually and that a considerable time interval elapse between the beginning of the stiffening of the mass and the "set," as determined by standard A. S. T. M. methods. Present various types of prepared gypsum cements or "set-stabilized" calcined gypsum cements, for instance as disclosed in Gallagher Patent No. 1,683,539 and King Patents Nos. 1,989,641; 2,078,198; 2,078,199 and 2,078,200, possess very short intervals between the time of the initial stiffening of the slurry and the "set" of the material.

6. HIGH STRENGTH, LOW POROSITY, AND PERMANENCE

While ordinary calcined gypsum possesses sufficient strength, when set, to function properly for some types of well-sealing operations, many such operations require a much higher degree of strength, density, and permanence than can be obtained with ordinary calcined gypsum. Uses requiring these qualities include the permanent cementing of surface casings or long strings, sealing of porous formations against water or gas under high pressure, bottom plugs employed for acidizing, tamping nitroglycerol, etc.

It is apparent that the above qualities must be present in any calcined gypsum cementitious composition designed for successful use under the extremely variable conditions which are encountered in oil well cementing operations. Uniformity of setting time, adequate strength development, and rate of hardening must be maintained under the most adverse field conditions, involving variations in mixing technique, aging, presence of set-modifying ingredients, and temperature variations.

Despite the fact that no known calcined gypsum composition has met all of the above requirements, I have succeeded in developing a composition which produces the results desired. This composition is in successful commercial use by the oil industry, many hundreds of tons are being sold, and its use is rapidly increasing.

The following formula has been found satisfactory, though it is obvious that the same may be varied without departing from the principles underlying this invention as defined in the hereto appended claims:

*Formula I*

|  | Parts |
|---|---|
| "Alpha" gypsum | 2000 |
| Sodium or potassium bisulfate | ½–10 |
| Portland cement or lime | 1–50 |
| Gum arabic | 2–20 |
| Tartaric acid or water soluble tartrate | 0–10 |

Consistency, as used herein, is defined as that amount of water in cubic centimeters which, when added to 100 grams of the material and thoroughly blended therewith, will provide a plastic mass of such flowability that it will just pour in a continuous stream from the lip of a cup.

The "alpha" gypsum above mentioned is a low-consistency, high strength, stable type of calcium sulfate hemihydrate, manufactured by the calcination of gypsum under pressure, as described and claimed in Randel and Dailey Patent No. 1,901,051. Its use in the above composition enables me to obtain strengths 200–300% greater than the strengths possible with the use of the ordinary types of calcined gypsum calcined under normal atmospheric pressure.

Sodium, potassium, or any alkali metal bisulfate, when employed in combination with an excess of Portland cement, lime, basic slag, or other basic materials capable of forming Ca(OH)$_2$ by hydrolysis upon dispersion in water, enables me to obtain a very satisfactory degree of set-stabilization against such set-disturbing influences as variation in time and intensity of mixing or agitation, contamination with set-accelerating or retarding materials, etc. I have found that heavy metal acid reacting sulfates, such as aluminum sulfate, Al$_2$(SO$_4$)$_3$; nickel sulfate, NiSO$_4$; ferrous sulfate, FeSO$_4$; copper sulfate CuSO$_4$; etc., are unsatisfactory for use in my composition. When such sulfates are used, the amounts of my preferred types of retarders required to produce a given time of set are greatly increased. Furthermore, the setting times are erratic, and the consistency of the composition is increased, with a corresponding decrease in strength and in hardness, and a loss of permanence. I ascribe this action to the chemical combination of the metallic radical of the above-named sulfates with the water-soluble retarder employed, with the formation of an insoluble metallic retarder salt, which is inoperative as a retarder upon the mixing of my cement with water. Whether or not this is the true explanation of what occurs, the result is as described. By the use of an alkali metal bisulfate, which does not react with my preferred types of water-soluble set retarders to produce insoluble salts, the desired combination of set-stabilization, strength, low consistency and set-regulation is achieved.

The addition of gum arabic in combination with lime or Portland cement, or similar lime-liberating material, enables me to reduce the consistency of my cement, thereby obtaining an increase in strength and in permanence, and a decrease in porosity, which thus enhances the value of the composition for certain uses as hereinbelow described.

For purposes of illustration only, a composition prepared as above, except that the consistency-reducing ingredients were absent, when prepared at a normal consistency of 43 cc. had a wet compressive strength of 1650 pounds per square inch; whereas, upon the addition of consistency-reducing ingredients, the consistency was reduced to 30 cc., and the wet compressive strength was increased to over 3000 pounds per square inch.

Portland cement, hydrated lime, basic slag, or material capable of forming Ca(OH)$_2$ by hydrolysis upon dispersion in water serve the following functions in my preferred composition: They furnish Ca(OH)$_2$ to react with the alkali metal bisulfates with the formation of set-stabilizing CaSO$_4$.2H$_2$O crystals upon addition of water to the cement, in accordance with the following typical reaction:

$$NaHSO_4 + Ca(OH)_2 + H_2O \rightarrow CaSO_4.2H_2O + NaOH$$

Such alkaline-reacting products tremendously increase the effectiveness of certain types of water-soluble retarders. Tartaric acid and soluble tartrates, for example, are very powerful retarders in the presence of Ca(OH)$_2$. In neutral or acid-reacting calcined gypsum cements their retarding effect is negligible. Further, these calcium-hydroxide-containing materials produce an alkaline-reacting cement which inhibits corrosion of the steel casings, pipes, etc., with which the set cement comes into contact.

I prefer to add sufficient alkaline material of the type above described to satisfy the chemical requirements of all of the acidic constituents present, plus an excess ranging up to 5%, based on the total weight of all of the constituents of the cement. In certain cases it is desirable to employ mixtures of Ca(OH)$_2$—forming materials, such as, for example, Portland cement and hydrated lime, to obtain the maximum consistency-reduction and maximum set-stability against the effects of aging, etc.

I have discovered that certain crystalline water-soluble retarders are very effective when used in combination with set-stabilizing chemicals of the types described herein in producing calcined gypsum cements of stable setting time under varying storage conditions and under varying temperatures up to about 175° F. Retarders of this type include citric acid and water-soluble citrates, tartaric acid and water-soluble tartrates in the presence of alkaline reacting cements, soluble borates, tannic acid, phosphates, etc. Of the above, the citrates, tartrates, and phosphates are particularly effective. Combinations of two or more of these retarders have been found in some cases to produce better results than the use of one of the constituents employed alone. For example, the following cement possesses the qualities above indicated:

*Formula II*

| | Parts |
|---|---|
| "Alpha" gypsum | 1975 |
| Portland cement | 15 |
| Powdered gum arabic | 6 |
| Potassium acid sulfate | 2 |
| Tartaric acid | ½ |
| Sodium hexametaphosphate | 1 |

For purposes of comparison, setting times under similar test conditions are shown for a cement formulated as above, except that the tartaric acid and phosphate were replaced by commercial retarder in an amount sufficient to produce a cement of about the same setting time as the above, tested when freshly made at a temperature of 75° F. It will be seen from the following table that the composition with the inorganic retarder was scarcely affected by the temperature at which the set took place, while the one containing the organic (keratinous) retarder was greatly varied, nor were the setting times before and after storage anywhere nearly alike.

*Testing conditions*

| | Time of set (Vicat needle—standard A. S. T. M. method) (minutes) | |
|---|---|---|
| | Water-soluble retarders | Commercial colloidal retarder |
| Fresh cement, tested at 75° F | 135 | 120 |
| Fresh cement, tested at 150° F | 150 | 450 |
| Cement tested at 75° F. after 1 week storage at 85° F., 65% rel. humidity | 132 | 195 |

The amount of retarder employed will depend upon the desired setting time of the composition.

For use under conditions where extremely high strength is not required, I may elect to use ordinary calcined gypsum in place of alpha gypsum as the major constituent of my composition. I may or may not employ gum arabic, in combination with an alkaline material, to reduce the consistency and increase the strength of a cement compounded with either alpha gypsum or ordinary calcined gypsum. The combined use of alkali metal bisulfates, Ca(OH)$_2$-producing material, and water-soluble crystalline retarders gives me the very necessary qualities of set stability and uniformity of set as required in calcined gypsum cements of the type required for the purposes of the present invention.

For certain specific uses such as, for example, where my cement is employed in sealing off water in rather tight or relatively impervious rock formations, it is desirable that a slurry of the cement penetrate as far as possible into the interstices of the formations. I have found that improved penetration of such tight formations is obtained with my cement by incorporating therewith small amounts of wetting agents, whose presence acts to reduce the surface tension of a water suspension of the cement. Sulfonated oils, alkyl aryl sulfonates, sodium salts of sulfonated higher alcohols such as lauryl alcohol, etc., are examples of my preferred types of wetting agents. Amounts used will vary from 0.1 to 10 pounds per ton, dependent upon the efficiency of the wetting agent and the degree of surface tension reduction required. I prefer to use wetting agents of such chemical composition that they will not be precipitated as insoluble calcium salts when added to water in the presence of calcium sulfate and calcium hydroxide. Alkylated aromatic mononuclear hydrocarbon sulfonates are especially useful in the presence of alkaline earths.

The above examples are purely illustrative of some of the objectives attained by the use of this new and improved composition. It was further found that extensive mixing as well as agitation did not substantially affect the setting time of the composition or otherwise impair its usefulness.

Though the above formulae are purely exemplary, it is obvious that others can be developed without substantial variation from the principles of this invention as defined by the appended claims.

In employing the composition hereinabove described, it is mixed with a sufficient amount of water to yield a flowable mass of a consistency appropriate to the manner of introduction employed, such as by pouring, pumping, etc. The composition may be varied as to its time of set, according to the conditions encountered, and is primarily intended to be employed in accordance with the teachings of the inventions disclosed in the applications of Andrew C. Hamilton, Jr., copending herewith, Serial Nos. 224,637 and 304,467, now issued as Patents Nos. 2,191,652 and 2,210,545.

I claim:

1. A composition of matter particularly adapted for sealing earth formations comprising calcium sulfate hemihydrate in major amount, minor amounts of set-modifying ingredients comprising a water-soluble crystalline retarder and an alkali metal acid sulfate, gum arabic, and a sufficient amount of an alkaline-reacting calcium compound to render the composition slightly alkaline when mixed with water.

2. A composition of matter particularly adapted for sealing earth formations, characterized by its stability as to setting time over long periods of time and its resistance to adventitious set-disturbing influences, comprising:

| | Pounds |
|---|---|
| Calcium sulfate hemihydrate | 2000 |
| Alkali metal acid sulfate | 1/2–10 |
| Portland cement | 1–50 |
| Gum arabic | 2–20 |
| Water-soluble crystalline retarder | 0–10 |

3. The composition of claim 2 wherein up to 20 parts of hydrated lime are added thereto.

4. A composition of matter particularly adapted to the sealing-off of earth formations comprising calcium sulfate hemihydrate in major amount, minor amounts of set-modifying ingredients comprising a water-soluble crystalline retarder and an alkali-metal acid sulfate, a sufficient amount of an alkaline-reacting calcium compound to render the composition slightly alkaline when mixed with water, and a small amount of an alkylated aromatic mononuclear hydrocarbon sulfonate as a water-soluble surface tension depressing agent.

5. A composition particularly adapted for sealing earth formations comprising

| | Parts |
|---|---|
| "Alpha" gypsum | 1975 |
| Portland cement | 15 |
| Powdered gum arabic | 6 |
| Potassium acid sulfate | 2 |
| Tartaric acid | 1/2 |
| Sodium hexametaphosphate | 1 |

MANVEL C. DAILEY.

CERTIFICATE OF CORRECTION.

Patent No. 2,292,616.                                August 11, 1942.

MANVEL C. DAILEY.

It is hereby certified that error appears in the printed specification of the above numbered patent requiring correction as follows: Page 1, second column, line 49, in the table, second column thereof, for "(Net set in 12 hrs.)" read --(Not set in 12 hrs.)--; and that the said Letters Patent should be read with this correction therein that the same may conform to the record of the case in the Patent Office.

Signed and sealed this 29th day of September, A. D. 1942.

(Seal)                                            Henry Van Arsdale,
                                                   Acting Commissioner of Patents.